June 1, 1954

R. W. BATT 2,680,001

ARRANGEMENT FOR COOLING TURBINE BEARINGS

Filed Nov. 13, 1950

Inventor
Richard W. Batt
by Charles A. Warren
Attorney

June 1, 1954 R. W. BATT 2,680,001
ARRANGEMENT FOR COOLING TURBINE BEARINGS
Filed Nov. 13, 1950 2 Sheets-Sheet 2
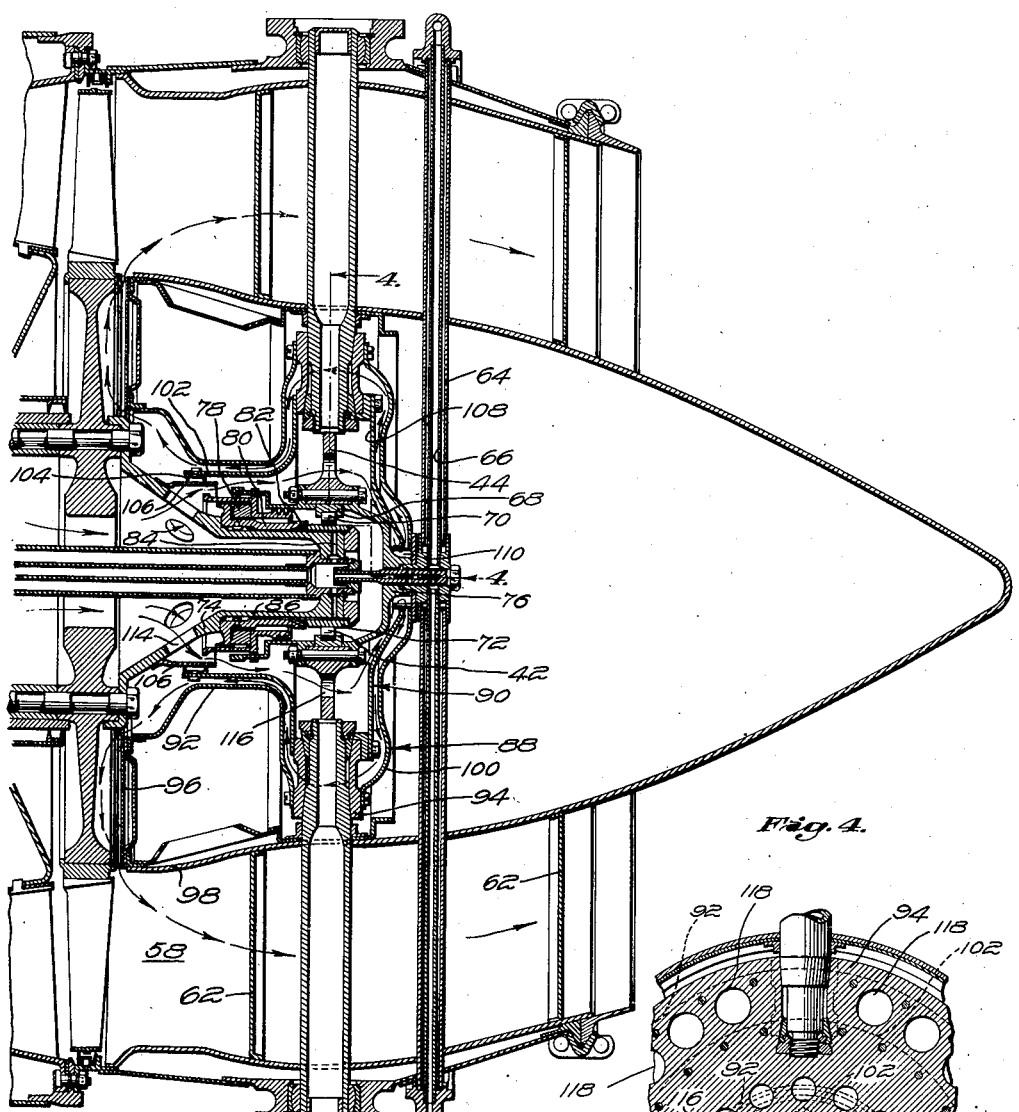

Patented June 1, 1954

2,680,001

UNITED STATES PATENT OFFICE 2,680,001

ARRANGEMENT FOR COOLING TURBINE BEARINGS

Richard W. Batt, Wethersfield, Conn., assignor to United Aircraft Corporation, East Hartford, Conn., a corporation of Delaware Application November 13, 1950, Serial No. 195,205

3 Claims. (Cl. 253—39.15)

The present invention relates to an arrangement for cooling a turbine bearing, more specifically the bearing at the downstream end of the turbine of a gas turbine power plant.

With gas turbines operating at the high temperatures presently possible and with the probability of even higher temperatures, it has been found essential to provide for insulating the turbine bearing from the heat of the exhaust gas from the turbine and also from the radiant heat from the structural parts of the turbine assembly which are heated by the exhaust gas. A feature of the invention is an arrangement of heat shields around the bearing such that a flow of cooling air may be circulated within the shields for minimizing the radiation of heat to the bearing.

In many of the gas turbine power plants there is available an excess of air delivered by the compressor which may be utilized for cooling purposes as in cooling the bearings. A feature of the present invention is a bleed-off of the air from the compressor at a predetermined point in the compression process such that the pressure of the cooling air after it has accomplished the required cooling of the bearing will be substantially the same as the exhaust gas from the turbine thereby minimizing the waste energy that would result if the gas were drawn off at a higher pressure.

Other objects and advantages will be apparent from the specification and claims, and from the accompanying drawings which illustrate an embodiment of the invention.

Fig. 3 is a longitudinal section on a larger scale of the downstream turbine bearing.

Fig. 4 is a sectional view on line 4—4 of Fig. 3.

Figure 1:
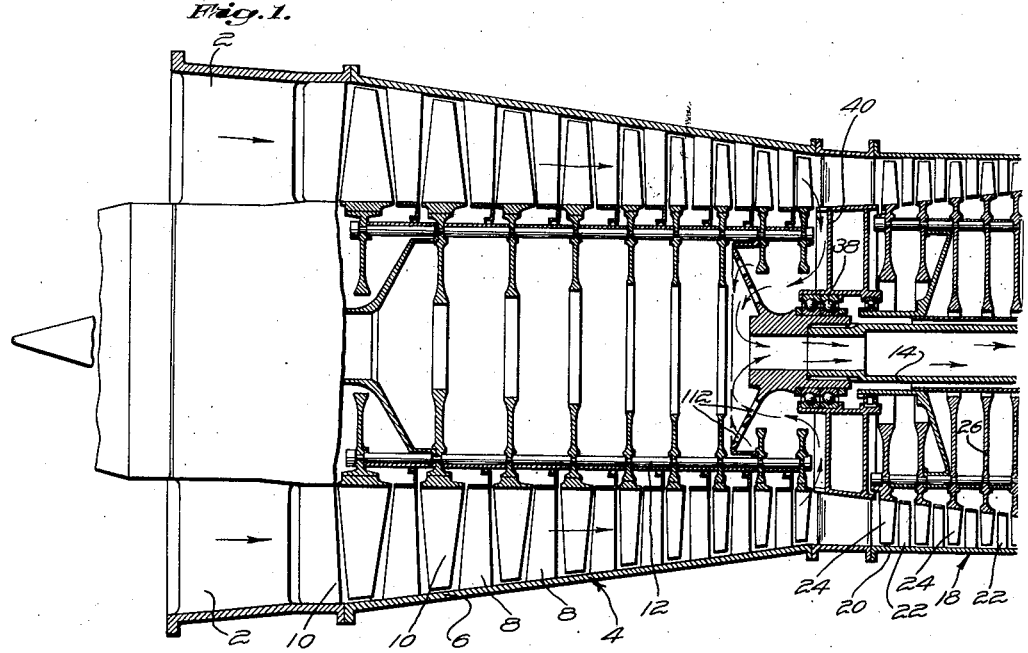
Fig. 1 is a longitudinal sectional view of a part of the compressor of the gas turbine power plant.
Figure 2:
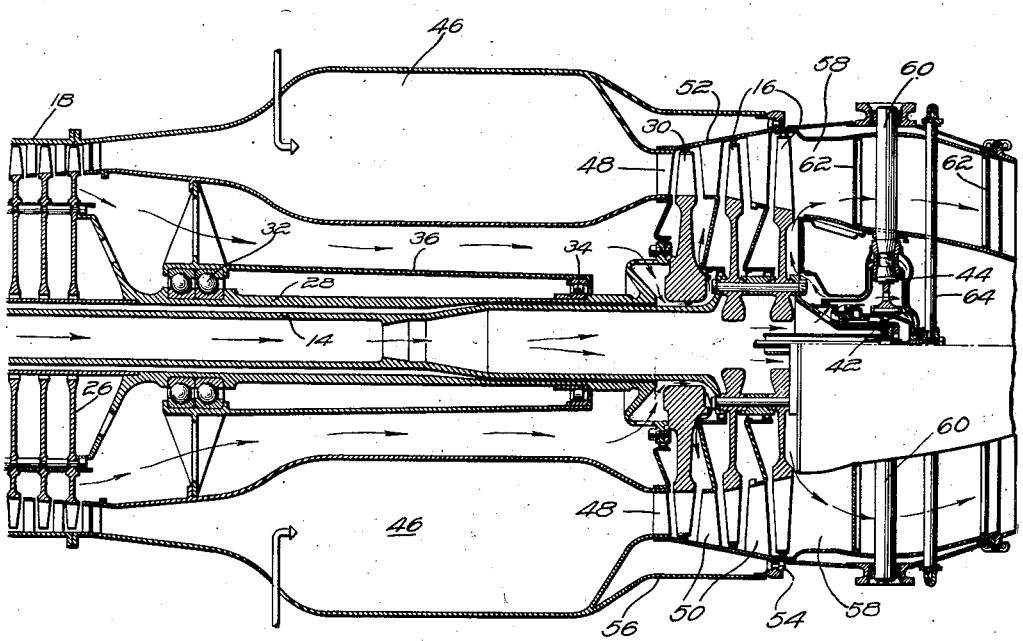
Fig. 2 is a longitudinal section of the remainder of the power plant of Fig. 1.

The invention is shown in a gas turbine power plant of the type in which the compression takes place in a number of stages with the entire compressor split so that one turbine stage drives a part of the compressor and the remaining turbine stages drive the remainder of the compressor. Thus as shown in Figs. 1 and 2 air enters the power plant through an annular inlet 2 entering the low pressure compressor 4. This compressor includes a casing 6 with a number of rows of radially extending stator vanes 8 alternating with rows of compressor blading 10 provided by the rotor 12. This rotor is driven by means of sleeve 14 which is connected as shown in Fig. 2 to the rotor discs 16 of the second and third stages.

From the downstream end of the compressor 4 the air enters the high pressure part 18 of the compressor, this part including a casing 20 having rows of vanes 22 alternating with rows of blades 24 on a rotor 26. The rotor 26 is connected by sleeve 28 to the rotor disc 30 of the first turbine stage. There is accordingly an outer spool made up of the rotor 26, sleeve 28 and disc 30 which is referred to as the high pressure spool which is supported by bearings 32 and 34 positioned in a part of the supporting structure 36 for the power plant. The low pressure rotor 12, sleeve 14 and discs 16 make up an inner or low pressure spool which may be supported by bearings 38 carried by a supporting structure 40 located between the low and high pressure parts of the compressor and a bearing 42 carried by a bearing housing 44 downstream of the last turbine stage. It is this bearing that requires the cooling provided by the present invention.

From the downstream end of the high pressure part of the compressor the air enters the combustion chambers 46 in which fuel is added to the air and in which combustion takes place for adding energy to the gas before it reaches the nozzles 48 for the first turbine stage. The row of nozzles 48 as well as the second and third stage nozzle vanes 50 may be carried by a casing 52 surrounding the turbine and secured as by bolts 54 to a ring 56 forming part of the supporting structure. Exhaust gas from the turbine discharges through an annular duct 58 which surrounds the downstream turbine bearing 42. The housing 44 is supported by radially extending legs 60 which project through the duct 58, as shown, but which may be shielded from direct contact with the exhaust gases by means of a fairing 62 which surrounds the legs. These fairings also enclose radially extending coolant tubes 64 and 66 providing for the supply of coolant and lubricant to the turbine rotors and also to the bearing 42.

Referring now to Fig. 3 the mounting 44 has positioned therein an outer bearing race 68 to receive the individual rollers 70 forming a part of the bearing 42. The inner race is formed by a sleeve 72 mounted on the outer surface of an end bell 74 mounted on the last turbine stage. A cap 76 mounted on the housing 44 forms an enclosure at the downstream side of the bearing for retaining lubricant therein. A suitable seal 78 which surrounds the end bell 74 at the upstream side of the bearing 42 forms a seal between the end bell and the housing 44 to prevent the escape of lubricant at the upstream side of the bearing. A part of the seal 78 is made up of a sleeve 80 surrounding the end bell and having axially extending passages 82 which direct lubricant against the rollers 70. Lubricant reaches the passages 82 by way of radial passages 84 in the end bell and grooves 86 on the outer surface of the end bell.

The bearing 42 and the cap 76 and seal 78 are all enclosed within spaced sets of heat shields 88 and 90, these shields being spaced apart for the flow of coolant between them and also for the flow of coolant within the inner shield. The part of the outer shield 88 upstream of mounting 44 is made up of an annular sheet metal member 92 bolted to a ring 94 forming a part of the bearing mounting 44 and extending forwardly to engage at its forward end with the inner edge of a disc 96 which is located adjacent to the last turbine disc and extends inwardly from the inner wall 98 of the duct 58. The member 92 is somewhat U-shaped in cross section so that between its ends it extends inwardly toward the axis of the rotor to be closely spaced from the inner shield as will hereinafter appear.

The downstream part of the outer shield 88 is in the form of a cap 100 overlying the cap 76 and bolted or otherwise secured at its outer edge to the outer periphery of the bearing mounting 44. This cap 100 has a central opening through which a portion of the cap 76 extends to provide access exteriorly of the shield for the supply of lubricant and coolant to the interior of the rotor and to the rotor bearing.

The inner shield 90 has an upstream part 102 extending in a ring around the turbine shaft and located between the shaft and the outer shield portion 92 in parallel spaced relation therethrough. The shield part 102 has a number of sealing flanges 104 at its upstream end to engage with a sealing ring 106 on the rotor to minimize the leakage of air from the space within the inner shield into the space between the shields. The downstream part of the inner shield 90 is in the form of a cap 108 underlying the cap 100 and similarly attached at its outer edge to the bearing mounting 44. The attachments of the inner and outer caps 100 and 108 are radially spaced as shown in the drawings. The inner cap 108 has a central opening through which a projecting hub on the cap 76 extends. The cap has axial grooves 110 which provide an interconnection from the space within the inner shield into the space between the shields.

Air for cooling the rear bearing by flowing around the bearing within the inner shield and also by flowing between the shields may be obtained from any suitable source. In the arrangement shown air is taken from the high pressure end of the low pressure compressor 4 where it flows through openings 112, Fig. 1, in the rotor 12 and thence through the sleeve 14 into the second and third stage turbine rotor, through the axial openings in the second and third stage discs, and outwardly through openings 114, Fig. 3, in the end bell 74, these openings being radially inward of the sealing ring 106. The air flows through the openings 114 into the space inside of the inner shield 90 being kept out of contact with the bearing 42 by the seal 78. The air flows along the path represented by the arrows in Fig. 3 through openings 116 in the bearing mounting 44 and into the space downstream of the bearing mounting between the cap 76 and the part 108 of the inner shield 90. The air then flows around the inner edge of the part 108 into the space between the part 108 and the cap 88. The air moves radially outward in this space to pass through other openings 118, Fig. 4, in the bearing mounting to reach the space between the parts 92 and 102 of the outer and inner shields. From this space the air flows over the downstream side of the last turbine disc and into the stream of exhaust gas from the turbine.

It is to be understood that the invention is not limited to the specific embodiment herein illustrated and described, but may be used in other ways without departure from its spirit as defined by the following claims.

I claim:

1. A gas turbine construction including a turbine having a rotor, a bearing for said rotor located on the downstream side thereof, an annular exhaust duct located on the downstream side of the turbine and through which gas is discharged from the turbine, said duct having inner and outer walls, and a bearing mounting for said bearing located within the space defined by the inner wall of said exhaust duct, in combination with a plurality of heat shields surrounding the bearing in enclosing relationship thereto and also in substantially concentric relationship with each other to provide an outer cooling space between the shields and an inner cooling space within the inner shield and around the bearing, means for directing a supply of cooling fluid into and through said inner cooling space and then through said outer cooling space, and a fluid connection from said outer cooling space to the duct adjacent the downstream side of the rotor for the escape of cooling fluid into the duct.

2. A gas turbine construction including a turbine having a rotor, a bearing for said rotor located on the downstream side thereof, an annular exhaust duct located on the downstream side of the turbine and through which gas is discharged from the turbine, said duct having inner and outer walls, and a bearing mounting for said bearing located within the space enclosed by said inner wall of said exhaust duct, in combination with a plurality of heat shields surrounding the bearing in enclosing spaced relationship thereto and also in concentric spaced relationship with each other to provide a cooling space between the shields and a cooling space within the inner shield, and means for directing a supply of cooling fluid into one of said spaces, said spaces being interconnected for a flow of the cooling fluid through said cooling spaces successively, the last one of said spaces through which the coolant flows having a fluid connection with the exhaust duct for the discharge of gas from said space into said duct, said fluid connection, including a disc member connected to the outer shield and to the inner wall and spaced from the rotor to define the fluid connection.

3. A gas turbine construction including a turbine having a rotor, a bearing for said rotor located on the downstream side thereof, an annular exhaust duct located on the downstream side of the turbine and through which gas is discharged from the turbine, said duct having inner and outer walls, a bearing mounting for said bearing located within the space enclosed by said inner wall of said exhaust duct, and means on said mounting for enclosing said bearing and forming a space for lubricant for said bearing, in combination with a plurality of heat shields surrounding and enclosing the bearing enclosing means in enclosing spaced relationship thereto and also in concentric spaced relationship with each other to provide an outer cooling space between the shields and an inner cooling space within the inner shield, said rotor having an axial aperture communicating with said inner space means for supplying a coolant through said aperture to said inner space, a fluid connection from said inner space to the outer space for the flow of coolant from said inner to said outer space, and a fluid connection from said outer space to the duct adjacent the downstream side of the rotor for the escape of cooling fluid from said outer space into the duct.

References Cited in the file of this patent

UNITED STATES PATENTS

| Number | Name | Date |
|---|---|---|
| 2,401,826 | Halford | June 11, 1946 |
| 2,414,788 | Altorfer | Jan. 28, 1947 |
| 2,425,177 | Cronstedt | Aug. 5, 1947 |
| 2,479,573 | Howard | Aug. 23, 1949 |
| 2,620,157 | Morley et al. | Dec. 2, 1952 |

FOREIGN PATENTS

| Number | Country | Date |
|---|---|---|
| 595,346 | Great Britain | Dec. 3, 1947 |
| 595,348 | Great Britain | Dec. 3, 1947 |